July 8, 1924.
J. E. TATE
SKILLET
Filed Dec. 1, 1922
1,500,163
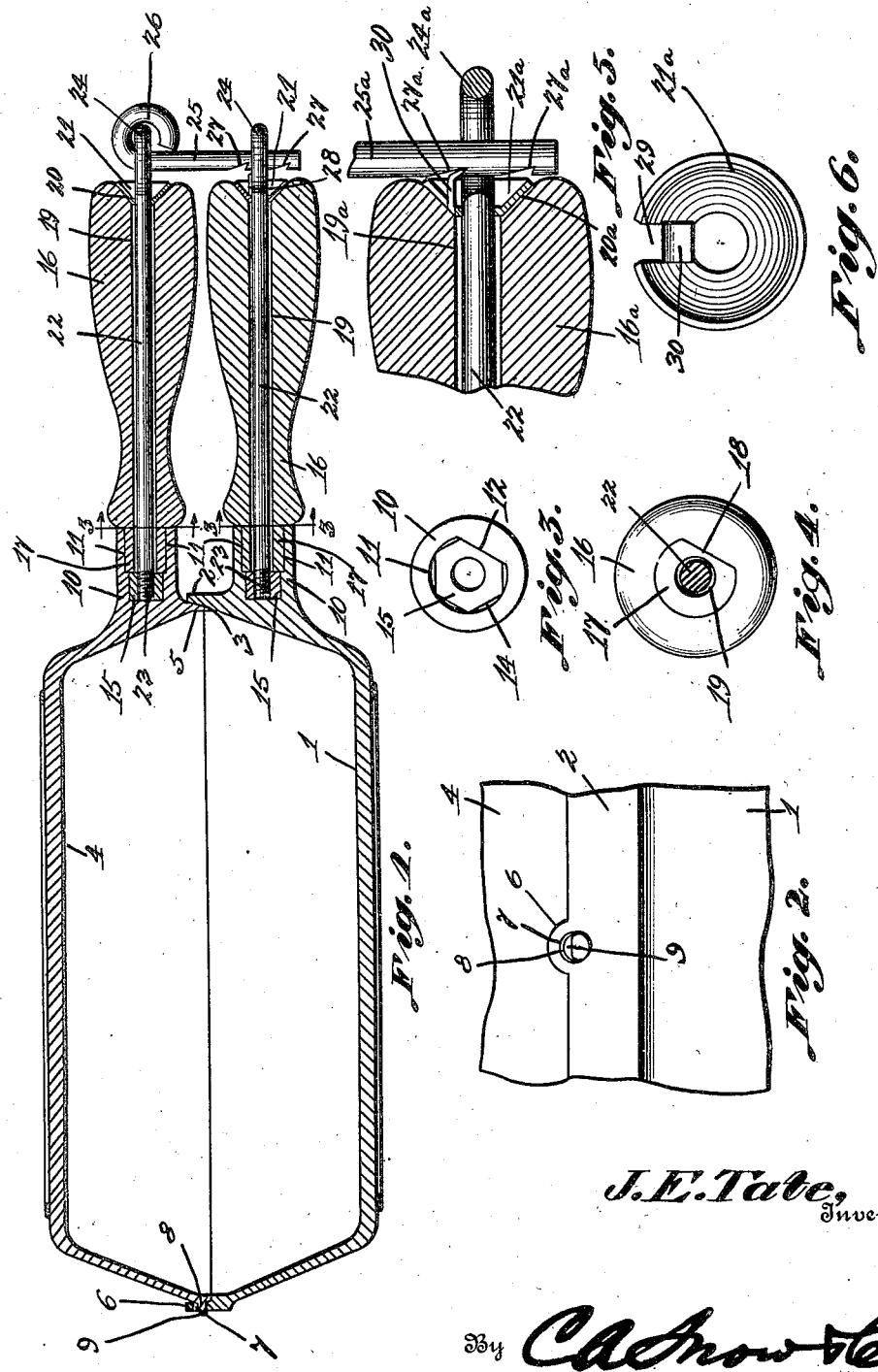
J. E. Tate,
Inventor
By C. A. Snow & Co.
Attorneys Patented July 8, 1924.

1,500,163

UNITED STATES PATENT OFFICE.

JAMES EDWARDS TATE, OF ELBERTON, GEORGIA.

SKILLET.

Application filed December 1, 1922. Serial No. 604,252.

*To all whom it may concern:*

Be it known that I, JAMES EDWARDS TATE, a citizen of the United States, residing at Elberton, in the county of Elbert and State of Georgia, have invented a new and useful Skillet, of which the following is a specification.

The device forming the subject matter of this application is a skillet, and one object of the invention is so to construct the device that the same will be steam tight, thereby retaining the flavor of the article which is being cooked.

Another object of the invention is to provide a skillet from which the handles may be removed, thereby permitting the article to be used as a baking pan.

A further object of the invention is to provide novel means for detachably mounting the handles on the parts of the skillet and to provide novel means for locking the handles together.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention, parts appearing in elevation; Figure 2 is a fragmental elevation; Figure 3 is an elevation showing the end of the socket on the pan; Figure 4 is an elevation showing one end of the handle, the securing device appearing in section; Figure 5 is a fragmental longitudinal section showing a modified form of the invention and Figure 6 is an elevation showing the washer used in that form of the invention shown in Figure 5.

The numeral 1 marks a pan having an upstanding marginal flange 2 and an internal transverse shoulder 3. The numeral 4 designates a pan having a thinned rim 5 received within the flange 2 of the pan 1 and abutting against the shoulder 3. The parts above alluded to are ground to a steam tight fit, so that the pans 1 and 4 when assembled as shown in Figure 1, will retain the steam, thereby preserving the flavor of the article which is being cooked. The flange 2 of the pan 1 has an upstanding lug 6 provided with an opening 7 adapted to receive a cylindrical projection 8 on the rim 5 of the pan 4, the projection having a beveled end 9 facilitating the insertion of the projection in the opening.

Opposite to the lug 6 and the projection 8, the pans 1 and 4 are supplied with tubular sockets 10, each socket having at its outer end, an irregularly shaped opening 11 provided with a flat side 12. Polygonal seats 14 are fashioned in the sockets 10 at the inner ends of the openings 11. Nuts 15 fit against rotation in the seats 14 and are held therein.

Handles 16 are provided and have reduced stems 17 of irregular cross section, each stem having a flat side 18. The stems 17 of the handles 16 are received against rotation in the openings 11 of the sockets 10. Each handle 16 has a longitudinal bore 19, the outer end of which is flared as shown at 20. Conical washers 21 are seated in the flared parts 20 of the bores 19. Securing devices 22 are located in the bores 19 and are threaded at their inner ends, as at 23, into the nuts 15. At their outer ends, the securing devices 22 are provided with loop-shaped heads 24 which abut against the washers 21. The head 24 of one securing device 22 carries a pivotally mounted latch 25 passing through the head of the other securing device, as shown in Figure 1, the latch 25 having an eye 26 whereby the latch is pivotally mounted on the head 24 of the uppermost securing device 22, as shown in Figure 1. Seats 27 are formed in one edge of the latch 25 and are adapted to cooperate with a keeper plate 28 secured to the head 24 of the lowermost securing device 22. It will be obvious that when the latch 25 is engaged with the keeper plate 28, and when the projection 8 is received in the opening 7 of the lug 6, the ground edges of the pans 1 and 4 will be held tightly in engagement, thereby to retain the steam and to improve accordingly the flavor of the article which is being cooked. Should it be desired to use the article as a baking pan, rather than as a skillet, the securing devices 22 may be detached from the nuts 15, thereby permitting a removal of the handles 26.

In Figures 6 and 5, a slight modification of the invention is shown. In the said figures, parts hereinbefore described have been designated by numerals previously used with the suffix "a." The modification consists in forming a slot 29 in one of the washers 21ª, the material thus freed being bent forwardly to form a resilient keeper 30 having an angularly disposed end 31 adapted to cooperate with the seats 27ª of the latch 25ª. This construction renders it unnecessary to attach the keeper plate to one of the heads 24, as shown in Figure 1. Further, since the keeper 30 has some resiliency, the pans 1 and 4 will be permitted to open slightly with respect to each other, should a dangerously high steam pressure accumulate within the pans.

What is claimed is:—

1. In a device of the class described, superposed pans having interengaging elements; handles; washers abutting against the handles, one washer carrying a keeper; securing members uniting the handles detachably with the pans and having heads engaging the washers; and a latch pivoted to one head and constructed to engage with the keeper of said washer of the other handle.

2. In a device of the class described, superposed pans having interengaging elements and provided with sockets, handles in the sockets, securing devices passing through the handles and having threaded engagement with the sockets, the handles being provided with loop-shaped heads, and a latch having an eye pivotally engaged with the head of one securing element, the latch being extended through the head of the other securing element, said other securing element being provided with means for engaging the latch.

In testimony that I claim the foregoing as my own, I have hereto affixed my signature.

JAMES EDWARDS TATE.